Oct. 23, 1962

H. A. WRIGHT 3,060,138

FOAMABLE POLYSTYRENE PARTICLES CONTAINING
ISOPENTANE AND PARAFFINIC HYDROCARBON
AND PROCESS OF MAKING SAME

Filed May 19, 1960

INVENTOR.
HAROLD A. WRIGHT.
BY Oscar B. Brumback
his ATTORNEY.

United States Patent Office 3,060,138
Patented Oct. 23, 1962

3,060,138
FOAMABLE POLYSTYRENE PARTICLES CONTAINING ISOPENTANE AND PARAFFINIC HYDROCARBON AND PROCESS OF MAKING SAME
Harold A. Wright, Beaver, Pa., assignor to Koppers Company, Inc., a corporation of Delaware
Filed May 19, 1960, Ser. No. 30,303
9 Claims. (Cl. 260—2.5)

This invention relates to an expandable thermoplastic material which, under the influence of heat, expands and when confined during this expansion, forms a foamed structure and to the method of preparing the expandable foam plastic.

The production of expandable thermoplastic materials is well known. The thermoplastic polymeric materials are rendered expandable by the incorporation in the plastic polymer of from 1% to 15% by weight of a suitable expanding agent. These expandable thermoplastic materials are made into cellular foam for various useful articles, such as floats, insulation panels, novelties, and cushioning materials such as for packaging.

It has been recognized that the lower the density of the foam structure produced from the expandable plastic, the better will be the material for uses such as insulation fillers, lightweight aggregate, etc. Efforts to produce low density materials, e.g. less than one pound per cubic foot, have involved using high percentages of a blowing agent. This has not been satisfactory because the cell structure of the expandable particle has enlarged to such an extent that the general foam structure has been undesirable. Efforts have also been made to partially expand the polymeric particles in an unconfined area and thereafter fully expanding the particles in a confined area; and this has reduced the density somewhat but the desired density of less than one pound per cubic foot has been difficult to obtain by this process. Attempts have been made to subject the foam structure to further expansion in a steam or otherwise heated atmosphere, and this also has decreased the density of the foam material but other less desirable physical characteristics occurred, for example, changing the cell size so as to give the structure undesirable characteristics.

It has now been discovered that polymeric material, particularly vinyl aromatic polymers having incorporated therein isopentane and a paraffinic hydrocrabon having between 16 to 46 carbon atoms in the carbon chain, provide a material capable of producing low density cellular foams of fine cell size. It has been found unexpectedly that the combination of isopentane and the paraffinic derivatives has a synergistic effect when the expandable polystyrene is subjected to heat to provide a foam structure of low density and fine cell size. The isopentane, itself, provides a cell structure of moderate to large cell size and a density generally greater than one pound per cubic foot in the expandable particle, and the paraffinic hydrocarbon, by itself, has no characteristics of causing a foaming action. Isopentane is incapable of expanding polystyrene to less than one pound per cubic foot density except with excessively high volatiles or under extreme forced expansion conditions of temperature and pressure. The inability of isopentane to produce foamable particle of very small cell size is shown in United States Patent No. 2,878,194, where Table I compares neopentane with isopentane as an expanding agent for polystyrene and shows that isopentane itself produces foamable particles of 1/16" to 1/8" (60 to 120 ml.) cell size. United States Patent No. 2,861,046 describes a process for the production of lightweight polystyrene comprised of 10 to 90 parts of polystyrene and 90 to 10 parts of a binding agent, which binding agent may be a paraffin wax. Although a paraffin wax is used in this patent, its purpose is to place a binding coating around the already formed polymer particles. The amount of wax used is at least 10% of the total polystyrene. The paraffinic derivative used in combination with isopentane in my invention does not act as a binding agent but is an integral part of an expansion system which contains no more than 2% by weight of the paraffinic derivative in polymer. Thus, the synergistic effect obtained by the combination of a paraffinic derivative and isopentane in this invention is remarkably demonstrated by the 2 to 6 mil cell size and the .5 pound per cubic foot density which characterizes the foamable particles produced therefrom.

In accordance with this invention, polymeric particles capable of being expanded into a cellular polymeric structure, are produced by forming an aqueous suspension of particles of a polymer derived from an ethylenically unsaturated hydrocarbon monomer and contacting the suspension with isopentane having dissolved therein from .5% to 2% of a paraffinic hydrocarbon having between 16 to 46 carbon atoms in the chain until the solution of paraffinic hydrocarbon in isopentane is integrated with the polymer particles, and separating the particles from the aqueous media. The paraffinic isopentane expanding agent is distributed substantially throughout the polymeric particles. Thereafter, the polymer particles having said solution of paraffinic hydrocarbon in isopentane expanding agent integrated therewith, can be individually expanded to produce discrete, cellular particles having a density of .5 pound per cubic foot. The pre-expanded particles can be placed in a mold and heated to the softening point of the polymer material, whereby the particles, due to exceptional expandable properties of the isopentane-paraffin expanding agent, will expand and coalesce into an integral cellular polymeric structure having superior fusion, low density, and uniform small cell size.

The above and further advantages and novel features of the invention will appear more fully from the following detailed description when the same is read in connection with the accompanying drawing. It is to be expressly understood, however, that the drawing is not intended as a definition of the invention but is for the purpose of illustration only.

The particles to be rendered expandable may be vinyl aromatic polymer particles, such as polystyrene particles, or particles of a copolymer of styrene and such monomers as butadiene, alphamethylstyrene, isobutylene, acrylonitrile, vinyl naphthalene, p-isopropylstyrene, ethylhexylacrylate, and the like. The particles are impregnated with the volatile aliphatic hydrocarbon isopentane containing .5 to 2% of a paraffin derivative by conventional means as hereinbefore described, preferably according to the method described in copending application of G. F. D'Alelio, Serial No. 394,230, now U.S. Patent No. 2,983,692. Thereafter, the expandable particles may be partially expanded by heating, using hot water, steam infra-red or radio frequency means to produce a partially expanded product of at least 1 pound per cubic foot density, capable of further expansion to form a low density foam of opaque appearance having uniform small cells throughout.

For the purpose of comparison, polystyrene was impregnated with several expanding agents and with my paraffin-isopentane expanding agent in accordance with the process described in copending application of G. F. D'Alelio, Serial No. 394,230, now U.S. Patent No. 2,983,692 to form expandable polystyrene. This expandable polystyrene was foamed in accordance with the process described in Stastny Patent No. 2,787,809 and the products were measured for cell diameter. The results were as follows in Table I:

TABLE I

| | Cell size, mils |
|---|---|
| Modified isopentane | 2–6 |
| N-pentane | 10–30 |
| Normal-hexane | 30–50 |
| Petroleum ether | 10–30 |

Surprisingly, the expanding agent of my invention had the smallest average cell size. It is most remarkable, when compared with Table I of United States Patent No. 2,878,194, in which unmodified isopentane was shown, to yield products of cell size of 1/16 inch to 1/8 inch (60 to 120 mils).

Figure 2:
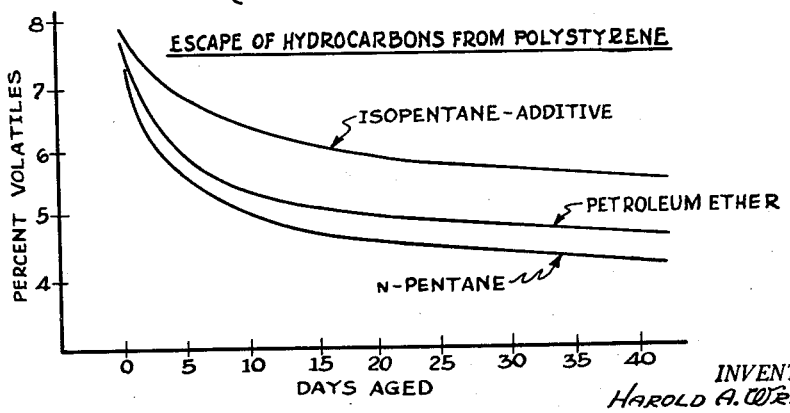
FIGURE 2 is a graph illustrating the escape of hydrocarbon blowing agent from representative samples of polystyrene expandable particles.

The escape of a hydrocarbon blowing agent from the polymer particle in which it is incorporated, is a measure of the usefulness of the expandable product. The slower the escape of expanding agent from the expandable material, the better commercial utility the expandable material will have. For purposes of evaluating my product with those products produced from other expanding agents, a series of tests were made. Approximately 60 grams each of dry impregnated particles were placed in a 5 pound size kraft bag which was folded twice at the top and stapled. The samples so stored were allowed to age at ambient room conditions (23°–25° C.) for a prolonged time. Periodically, the beads were shaken, representative samples were removed for total volatile analysis, and the bag sealed for further aging. The total volatiles were plotted against days of aging to yield the results shown in FIGURE 2.

Figure 1:
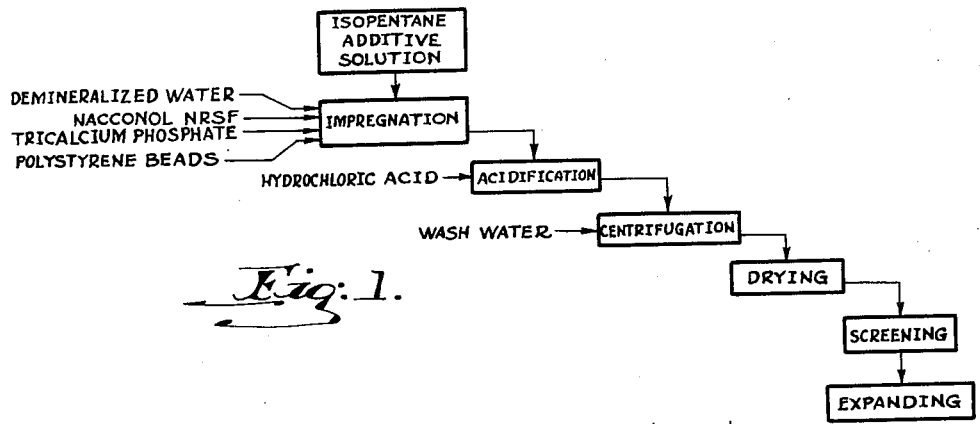
FIGURE 1 is a flow diagram illustrating a preferred method for preparing the expandable polystyrene particles of this invention.
Figure 3:
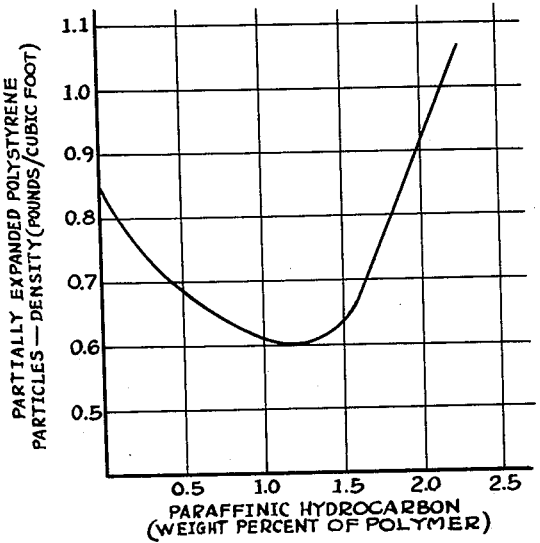
FIGURE 3 is a graph illustrating differences in density of various partially expanded polymer particles.

The expanding agent is prepared by dissolving .5 to 2% by weight of polymer of a paraffinic derivative of hydrocarbon containing 16 to 46 carbon atoms in isopentane at about 25° C. At least .5% of the paraffinic derivative is necessary to give the synergistic expanding power whereas when additive in amounts greater than 2% by weight of polymer are added to the isopentane expanding agent, excessive shrinkage and an undesirable increase in density of the product occurs. FIGURE 3 graphically illustrates the importance of using .5 to 2% of the additive of this invention of the total weight of polymer. If the amount of additive be greater than 2%, the density of the product will be greater than one pound per cubic foot and will continue to go proportionately higher as the concentration of additive is increased. The curve of this drawing was developed by measuring the density of several particles of polystyrene which were partially expanded in boiling water for 3 minutes and which particles contained different amounts of additive. The additive used in each polystyrene particle of this illustrative test was a paraffin hydrocarbon containing 20 to 40 carbon atoms in the carbon chain and having a melting point of 130° F.

The isopentane which is used as the volatile aliphatic hydrocarbon may be commercial grade which boils within the range of 24° C. to 32° C. The paraffinic isopentane foaming agent is capable of being integrated with the particular polymeric material being treated without causing agglomeration or precipitation from the suspension.

The following, which for purposes of ease in explanation, is termed Example I, will illustrate a manner in which the invention may be carried out.

*Example I*

To a 100 gallon kettle equipped with a stirrer, 122 parts by weight of demineralized water, 0.35 part by weight dodecyl benzene sulfonate (Nacconol NRSF) and 1.04 parts of tricalcium phosphate, was charged successively with agitation. The vessel was then charged with 100 parts of polystyrene particles (sold under the trade name "Dylene 8"); 1.25 parts of pulverized paraffin wax (No. 3425 Sunoco—melting point of 130° F.) was dissolved in 11 parts by weight of isopentane in a separate calibrated mix tank at about 25° C. The aqueous suspension of polystyrene particles was heated to 60° C. and the vessel purged free of air with inert gas. The solution of wax in the isopentane was fed to the impregnation vessel at a constant rate over 1.5 hour period. The impregnation vessel was heated from 60° to 90° C. over a .5 hour period. The vessel was maintained at 90° C. for a total of ten hours. The pressure in the vessel at the start of this ten hour period was 86.5 p.s.i.g. and at the end of the period was about 58 p.s.i.g. The vessel was cooled to 25° to 28° C. and the suspension was transferred into a wash kettle. Hydrochloric acid was added to the impregnation slurry to lower the slurry pH from 6.5 to 1.2–1.0 and is to dissolve the calcium phosphate from the surface of the bead product. Thereafter, the beads were passed through a continuous centrifuge and washed with about 2.0 gallons of wash water per pound of product at a temperature of about 15° to 25° C. to rid the bead surface of residual Nacconol.

The washed beads (5% surface moisture, nil internal moisture) were passed through a continuous rotary dryer maintained at 120° to 125° F. and then conveyed to a storage bin from where they were screened and packaged. The impregnated beads contained 7.5 to 8.0% by weight of volatiles.

Dried expandable particles made as above may be heated immediately after manufacture, using conventional means such as described on page 19 of the Koppers Company, Inc. booklet entitled "Dylite Expandable Polystyrene," to make low density foam i.e., one having a density of .5 pound per cubic foot, or they may be stored for several months for the production of foamed articles at a later date. The particles may be partially expanded to produce a free flowing low density product from which only a portion of the aliphatic hydrocarbon has been volatilized. Such partially expanded particles may be stored or further expanded by the application of heat to make an integral, low density opaque foam having uniform small cells.

Using the procedure of Example I, expandable polystyrene was produced using various paraffinic derivatives dissolved in isopentane. The results are tabulated below as Table II.

applications where lightweight foamed objects are of interest.

TABLE II

| Additive identity | Melting point, °F. | Carbon atoms | Percent of polymers | Total volatiles | Expansion and foam structure of partially expanded particles | | | | |
|---|---|---|---|---|---|---|---|---|---|
| | | | | | Boiling water 3 minutes | | | Steam 10 minutes | |
| | | | | | Bulk density | Shrinkage | Cell size | Bulk density | Cell size |
| Sunoco Wax—2424 | 126 | 20-40 | 1.25 | 7.07 | .73 | Very slight | 2- 6 | .57 | 2- 6 |
| Sunoco Wax—3425 | 130 | 20-40 | 1.25 | 7.18 | .73 | ......do...... | 2- 6 | .55 | 2- 6 |
| Sunoco Wax—3420 | 136 | 20-40 | 1.25 | 6.98 | .76 | ......do...... | 4- 7 | .55 | 4- 7 |
| Tetracosone | 124 | 24 | 1.25 | 7.14 | .73 | ......do...... | 4- 7 | .55 | 4- 7 |
| Octacosane | 143 | 28 | 1.25 | 7.12 | .73 | ......do...... | 4- 6 | .53 | 4- 6 |
| Dotriacontane | 158 | 32 | 1.25 | 7.09 | .73 | ......do...... | 2- 6 | .57 | 2- 6 |
| Hexamethyl tetracosane | Liquid | 30 | 1.25 | 7.15 | .80 | ......do...... | 4- 6 | .57 | 4- 6 |
| Sunoco Wax—3425 | 130 | 20-40 | .5 | 8.36 | .68 | None | 5- 8 | | |
| Do | 130 | 20-40 | 2.25 | 8.25 | .92 | Gross | 30-50 | | |
| Do | 130 | 20-40 | 1.00 | 7.09 | .80 | Very slight | 2- 6 | | |
| None | | | None | 7.99 | 1.09 | None | 4- 8 | .77 | 10-15 |
| Do | | | None | 7.20 | 1.32 | ......do...... | 2- 6 | .89 | 6-10 |

In the above table, total volatiles were determined by subjecting one gram of the dry impregnated particles to a temperature of 150° C. for one and one-half to two hours and measuring the loss in weight as a percent of the original weight of dry beads.

The expansion characteristics of the impregnated polystyrene were determined (1) by immersion of the beads in boiling water for three minutes, and (2) by exposure of the beads to steam at atmospheric pressure for ten minutes. The bulk density of the resultant expanded particles which value directly determines the density of any article molded therefrom was measured.

The appearance of expanded foams was evaluated in the individual partially expanded beads considering (1) shrinkage and (2) the average size of the cells. Item 1 was determined by straightforward visual observations. Cell size was determined microscopically using a projected stage micrometer scale to measure the approximate cell diameters. To this end, the partially expanded bead was sliced into two hemispheres and a wedge-like, semicircular wafer whose straight edge formed the apex of the wedge, was cut from one hemisphere. This wafer was viewed under 50× magnification, the image being superimposed on the projected scale above to permit direct measurement of the various cells along the base of the semi-circle. By having the apex of the wedge coincide with this base, interference from "shadows" of other cells behind the one being measured was avoided. The range of values recorded in the chart represent the majority of cells along the base.

The foregoing has described a novel foamable article and a method for producing the foamable article. The novel foamable article of this invention, when partially expanded by the application of heat thereto, will expand to densities as low as .5 pound per cubic foot. The thus partially expanded articles or beads also contain individual uniform cells which measure 2 to 6 mils in diameter. The partially expanded articles can be placed in a mold, subjected to heat causing them to further expand and fuse together into a shaped foam object. The shaped foam object will advantageously be of the same density as the partially expanded particles from which the shaped object is made and the individual foam particles making up the foamed object will also have substantially uniform cells 2 to 6 mils in diameter.

The foamed products made from these novel particles are useful as insulated building panels, floats, decorative display objects, novelties and cushioning materials. The ability to expand to low densities in a given volume makes the use of the particles economically advantageous for all applications where lightweight foamed objects are of interest.

What is claimed is:

1. A foamable polystyrene particle containing substantially uniformly distributed throughout isopentane and from about .5 to 2% of a paraffinic hydrocarbon having between 16 to 46 carbon atoms which styrene particle upon heating will expand to a structure of less than one pound per cubic foot density having uniformly small cells.

2. A foamable styrene polymeric particle containing substantially uniformly distributed throughout a solution of a paraffinic hydrocarbon having between 16 to 46 carbon atoms in isopentane to provide from 5 to 10 percent of isopentane and from about .5 to 2 percent of a paraffinic hydrocarbon in said particle which particle upon heating will expand to a structure of less than one pound per cubic foot density having uniformly small cells.

3. Foamable styrene polymeric particles which upon heating will expand to a structure of less than one pound per cubic foot having uniformly small cells produced by forming in an aqueous medium a suspension of particles of a polymer obtained by polymerizing an ethylenically unsaturate hydrocarbon monomer selected from the group consisting of styrene, butadiene, alphamethylstyrene, isobutylene, acrylonitrile, vinyl naphthalene, P-isopropylstyrene, 2-ethylhexlacrylate and mixtures thereof contacting said suspension with a solution of from about .5 to 2% of a paraffin having between 16 and 46 carbon atoms in isopentane, until said solution is substantially uniformly distributed throughout said particles and separating said particles from the aqueous media.

4. A foamable styrene polymer particle containing substantially uniformly distributed through isopentane and from about .5 to 2% of a paraffinic derivative of hydrocarbons having between 16 and 46 carbon atoms which polymer particle upon heating will expand to a structure of less than one pound per cubic foot density having uniformly small cells.

5. Foamable polystyrene particles which upon heating will expand to a structure of less than one pound per cubic foot having uniformly small cells produced by forming in an aqueous medium a suspension of particles of a polymer obtained by polymerizing an ethylenically unsaturated hydrocarbon monomer selected from the group consisting of styrene, butadiene, alphamethylstyrene, isobutylene, acrylonitrile, vinyl naphthalene, P-isopropylstyrene, 2-ethylhexylacrylate and mixtures thereof contacting said medium with a solution of from about .5 to 2% of a paraffin having between 16 and 46 carbon atoms in isopentane until said solution is substantially uniformly distributed throughout said particles and separating said particles from the aqueous media.

6. A foamable styrene polymeric particle containing substantially uniformly distributed throughout a solution of paraffinic hydrocarbon having between 16 and 46 carbon atoms in isopentane to provide from 6.5 to 8.0 parts of isopentane and from .75 to 1.25 parts of a paraffinic hydrocarbon in said particle which particle upon heating will expand to a structure of less than one pound per cubic foot density having uniformly small cells.

7. A method for the production of foamable styrene polymeric particles which upon heating will expand to a structure of less than one pound per cubic foot having uniformly small cells which comprises forming in an aqueous medium a suspension of particles of a polymer obtained by polymerizing an ethylenically unsaturated hydrocarbon monomer selected from the group consisting of styrene, butadiene, alphamethylstyrene, isobutylene, acrylonitrile, vinyl naphthalene, p-isopropylstyrene, 2-ethylhexylacrylate and mixtures thereof contacting said suspension with isopentane having dissolved therein from about .5 to 2% of a paraffinic hydrocarbon having between 16 and 46 carbon atoms until said solution is substantially uniformly distributed throughout said particles and separating said particles from the media.

8. A method for the production of foamable styrene polymeric particles which particles upon heating will expand to a structure of less than one pound per cubic foot density having uniformly small cells comprises substantially uniformly distributing isopentane having dissolved therein from about .5 to 2% of a paraffinic hydrocarbon containing 16 to 46 carbon atoms throughout a polymer obtained by polymerizing an ethylenically unsaturated hydrocarbon monomer selected from the group consisting of styrene, butadiene, alphamethylstyrene, isobutylene, acrylonitrile, vinyl naphthalene, p-isopropylstyrene, 2-ethylhexylacrylate and mixtures thereof.

9. A method for the production of foamable styrene polymeric particles which particles upon heating will expand to a structure of less than one pound per cubic foot density having uniformly small cells comprises substantially uniformly distributing 5 to 15 parts of isopentane having dissolved therein .5 to 2 parts of a paraffinic hydrocarbon containing 16 to 46 carbon atoms throughout a polymer obtained by polymerizing an ethylenically unsaturated hydrocarbon monomer selected from the group consisting of styrene, butadiene, alphamethylstyrene, isobutylene, acrylonitrile, vinyl naphthalene, p-isopropylstyrene, 2-ethylhexylacrylate and mixtures thereof.

References Cited in the file of this patent

UNITED STATES PATENTS

| | | |
|---|---|---|
| 2,857,625 | Carlson | Oct. 28, 1958 |
| 2,861,046 | Stastny | Nov. 18, 1958 |
| 2,878,194 | Rubens | Nov. 17, 1959 |

UNITED STATES PATENT OFFICE
CERTIFICATE OF CORRECTION

Patent No. 3,060,138            October 23, 1962

Harold A. Wright

It is hereby certified that error appears in the above numbered patent requiring correction and that the said Letters Patent should read as corrected below.

Column 4, line 25, for "0.35" read -- .035 --; column 6, line 56, for "through" read -- throughout --.

Signed and sealed this 31st day of March 1964.

(SEAL)
Attest:
ERNEST W. SWIDER

EDWARD J. BRENNER

Attesting Officer

Commissioner of Patents